UNITED STATES PATENT OFFICE.

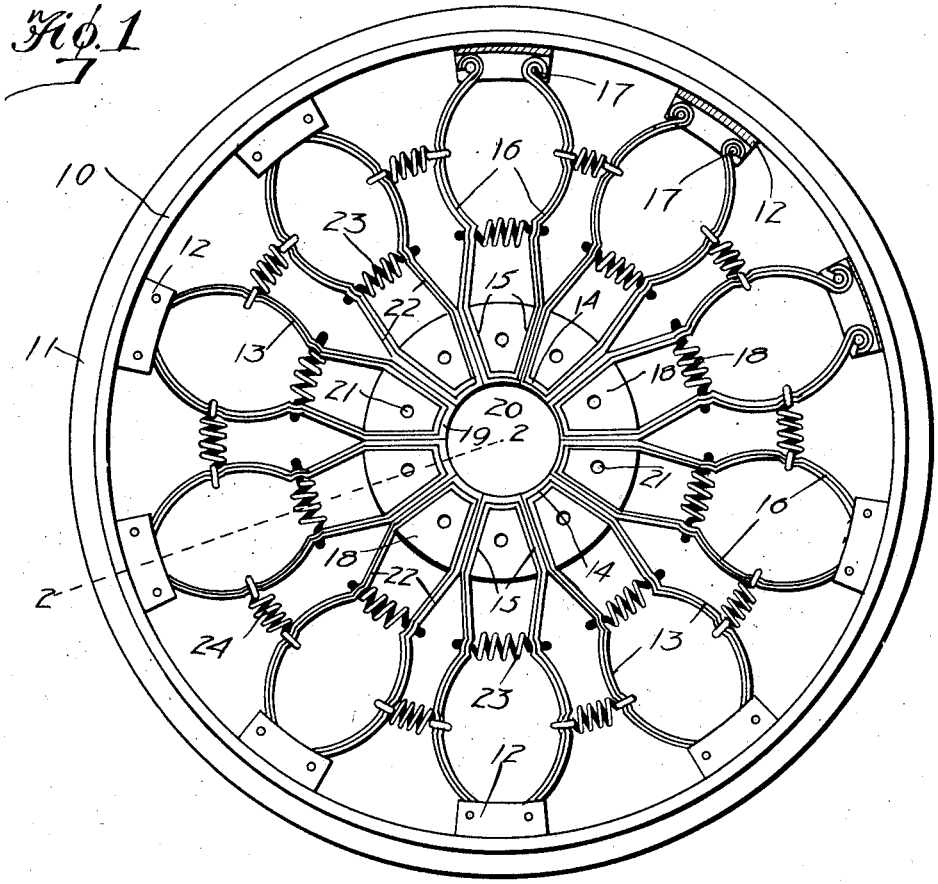
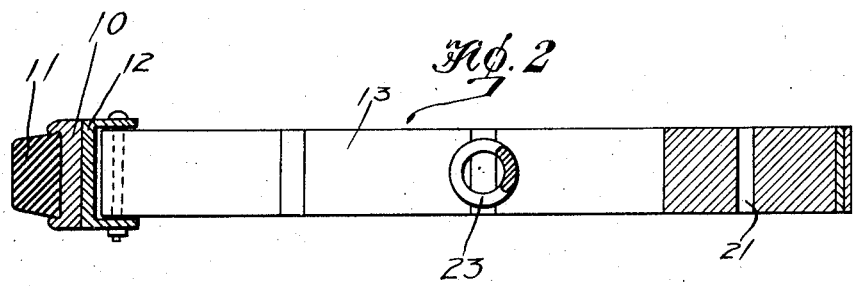

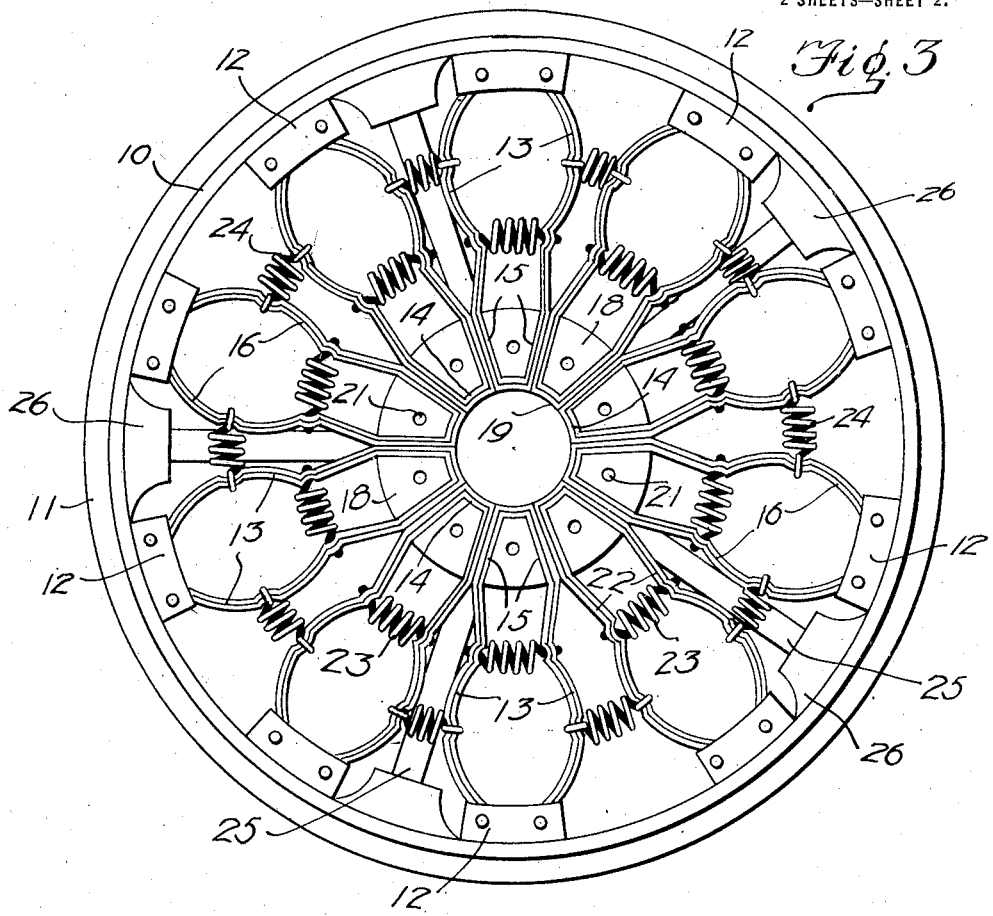
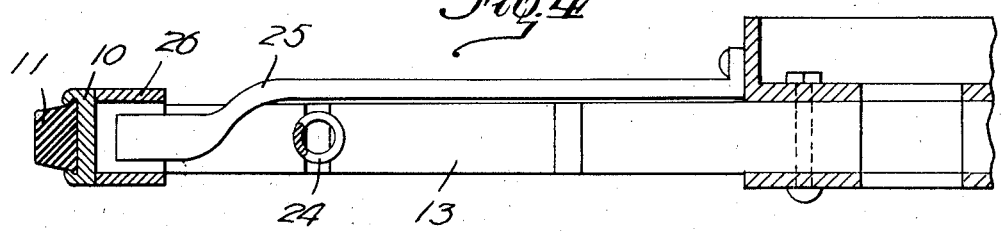

THOMAS ROZANKOVICH, OF GALVESTON, TEXAS.

SPRING-WHEEL.

1,345,250.  Specification of Letters Patent.  Patented June 29, 1920.

Application filed December 16, 1919. Serial No. 345,195.

*To all whom it may concern:*

Be it known that I, THOMAS ROZANKOVICH, a citizen of the United States, residing at Galveston, in the county of Galveston and State of Texas, have invented new and useful Improvements in Spring-Wheels, of which the following is a specification.

This invention relates to spring wheels for vehicles and has for its object the provision of a spring wheel in which the springs are rigidly secured to the hub portion and pivotally connected with the rim portion, the springs extending radially and constituting the spokes of the wheel and the adjacent springs and the arms of each spring being connected by auxiliary springs.

An important object is the provision of a spring wheel of this character provided with means whereby any circumferential distortion will be prevented and consequently adapted for use as a rear or driving wheel, the structure including a spider-like portion secured upon the brake drum and engaging within socket members carried by the rim.

Another object is the provision of a wheel of this character which obviates the use of a pneumatic tire, using merely a cushion tire and which consequently avoids all the disadvantages incidental to punctures and blow-outs and the like while not sacrificing resilience and ease of riding.

An additional object is the provision of a spring wheel of this character which will be simple and inexpensive in manufacture, efficient in use, durable in service, and a general improvement in the art.

With the above and other objects and advantages in view the invention consists in the details of construction to be hereinafter more fully described and claimed and illustrated in the accompanying drawings in which—

Figure 1 is a side elevation of my wheel in its simplest form adapted for use upon the front of a vehicle.

Fig. 2 is a cross sectional view therethrough,

Fig. 3 is a side elevation of the wheel equipped with the circumferential distortion preventing means and adapted for use as a driving wheel, and Fig. 4 is a cross sectional view therethrough.

Referring more particularly to the drawings and especially to Figs. 1 and 2, I have shown my wheel as comprising a rim 10 carrying a solid or cushion tire 11. Secured at intervals upon the inner periphery of the rim 10 are pairs of spaced L-shaped plates 12, for a purpose to be described.

The spokes of the wheel are formed from a plurality of spring members 13 each of which is bent intermediate its ends to provide a portion 14 having inclined sides 15 from which extend the arms 16 which have their terminals formed as eyes 17 pivoted between the pairs of spaced plates 12. Within the portion 14 of each spring is disposed a wooden block 18 of the same shape and the shape of these blocks 18 and the portions 14 of the springs is such that when the inner ends of the spring spokes are brought together they will form in effect a ring-member 19 having a central hole 20. This ring-like member 19 is adapted to be engaged by the stationary and removable flanges of a hub, not shown, and extending through the blocks 18 are holes 21 for the passages of the bolts used in securing the wheel to the hub. Adjacent the block 18 each spring member 13 has its arms bent toward each other, as shown at 22, and connected by an auxiliary spring 23 secured to the arms in any desirable manner. Adjacent their outer ends, the spring members 13 are connected by auxiliary springs 24, the function of which is to strengthen the wheel and take care of any overload thereon.

Referring especially to Figs. 3 and 4, I have shown the wheel as constructed in identically the same manner as in Figs. 1 and 2 except that I provide an additional feature, namely, a plurality of arms 25 which are secured to the ring portion 19 or to the brake drums of the rear hubs, not shown, and which extend radially of the wheel. At its outer end, each arm 25 is slidably engaged within a socket member 26 secured upon the inner periphery of the rim 10. In this construction it will be seen that owing to the slidability of the radial arms within their guide sockets the resilience of the wheel will not be sacrificed while at the same time any circumferential distortion will be prevented. This form of the wheel is therefore adapted for use as a driving wheel.

From the foregoing description and a study of the drawings it will be apparent that I have thus provided a very simple and inexpensive spring wheel construction which will be very efficient and easy riding, which consists of but few parts, which is consequently not liable to become deranged, and which will therefore efficiently perform all the functions for which it is intended.

While I have shown and described the preferred embodiment of my invention it is of course to be understood that I reserve the right to make such changes in the form, construction, and arrangement of parts as will not depart from the spirit of the invention or the scope of the subjoined claims.

Having thus described my invention I claim:

1. A spring wheel comprising a rim carrying a cushion tire, a plurality of plates secured upon the inner periphery of said rim and arranged in spaced relation in pairs, a plurality of spring members constituting spokes and each having its intermediate portion bent into substantially trapezoidal shape with sides of such inclination that the inner ends of the spokes will form a ring-like structure constituting the hub portion of the wheel and engageable between the fixed and removable flanges of a hub, wooden blocks disposed within the inner ends of said spring members and provided with holes for the passage of hub securing bolts, each of said spring spokes including arms terminating in eyes pivoted between said pairs of plates.

2. A spring wheel comprising a rim carrying a cushion tire, a plurality of plates secured upon the inner periphery of said rim and arranged in spaced relation in pairs, a plurality of spring members constituting spokes and each having its intermediate portion bent into substantially trapezoidal shape with sides of such inclination that the inner ends of the spokes will form a ring-like structure constituting the hub portion of the wheel and engageable between the fixed and removable flanges of a hub, wooden blocks disposed within the inner ends of said spring members and provided with holes for the passage of hub securing bolts, each of said spring spokes including arms terminating in eyes pivoted between said pairs of plates, the arms of each spring being somewhat converged adjacent each block, an auxiliary spring connecting the arms of each spring spoke at said converging points, and other auxiliary springs connecting the arms of adjacent spring spokes adjacent the outer portions thereof.

3. A spring wheel comprising a rim carrying a cushion tire, a plurality of plates secured upon the inner periphery of said rim and arranged in spaced relation in pairs, a plurality of spring members constituting spokes and each having its intermediate portion bent into substantially trapezoidal shape with sides of such inclination that the inner ends of the spokes will form a ring-like structure constituting the hub portion of the wheel and engageable between the fixed and removable flanges of the hub, wooden blocks disposed within the inner ends of said spring members and provided with holes for the passage of hub securing bolts, each of said spring spokes including arms terminating in eyes pivoted between said pairs of plates, the arms of each spring being somewhat converged adjacent each block, an auxiliary spring connecting the arms of each spring spoke at said converging points, and other auxiliary springs connecting the arms of adjacent spring spokes adjacent the outer portions thereof, and means for preventing circumferential distortion comprising socket members secured upon the inner periphery of said rim, and a plurality of radially extending arms slidably engaged within said socket members and adapted to be secured to the drum brake of a hub.

In testimony whereof I affix my signature.

THOMAS ROZANKOVICH.